United States Patent
Kamlukin

[19]

[11] Patent Number: 6,080,077
[45] Date of Patent: Jun. 27, 2000

[54] PLANETARY GEAR DRIVE TRAIN

[75] Inventor: Igor Kamlukin, 11506 N. Shorecliff La., Mequon, Wis. 53092

[73] Assignee: Igor Kamlukin, Meqoun, Wis.

[21] Appl. No.: 09/249,898

[22] Filed: Feb. 15, 1999

[51] Int. Cl.$^7$ ................................................. F16H 57/08
[52] U.S. Cl. ........................... 475/339; 475/149; 180/372
[58] Field of Search ................................... 475/149, 331, 475/338, 339, 340, 341, 342; 180/371, 372

[56] References Cited

U.S. PATENT DOCUMENTS

| | | | |
|---|---|---|---|
| 1,808,748 | 6/1931 | Apple | 475/149 |
| 1,998,891 | 4/1935 | Benson | 475/342 |
| 4,043,326 | 8/1977 | Buuck | 475/331 |
| 4,380,274 | 4/1983 | Abraham et al. | 180/372 |
| 5,472,387 | 12/1995 | Kamlukin | 475/338 |
| 5,692,989 | 12/1997 | Kamlukin | 475/346 |
| 5,759,128 | 6/1998 | Mizutani et al. | 475/149 |

FOREIGN PATENT DOCUMENTS

WO 99/36286  7/1999  WIPO .

OTHER PUBLICATIONS

Applicant's Exhibit B—"R-factors quickly give speed ratios of Planetary gear systems", article in *Product Engineering*, Jan. 6, 1994, pp. 59–68.
Applicant's Exhibit A—Page describing "Planetary Epicyclic Drive", admitted prior art.

*Primary Examiner*—Sherry L. Estremsky
*Attorney, Agent, or Firm*—Quarles & Brady LLP

[57] ABSTRACT

A differential drive train for driving two laterally opposite axially aligned driven units, for example wheel hubs, in the same rotational direction has a motor with a motor housing and motor shaft, with a shaft affixed to the housing so as to rotate in a direction opposite from the motor shaft. A planetary gear cluster is mounted adjacent an outer end of each of the shafts so as to provide a gear reduction between the shaft and an output gear. One of the planetary gear clusters drives its output gear, which is fixed to the driven unit, in a direction opposite from its input shaft. The input shafts extend through their respective planetary gear clusters so as to mount their respective driven units on bearings on the input shaft and drive the planetary gear cage. Between the motor and the planetary gear clusters, the input shafts extend through stationary tubes to which the stationary gears are affixed.

9 Claims, 5 Drawing Sheets

PLANETARY GEAR DRIVE TRAIN

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates to drive trains, and in particular to planetary gear drive trains.

2. Discussion of the Prior Art

The transmission of a three or four wheeled vehicle, such as a golf cart, typically drives the rear wheels through a differential axle. Power is input to the differential axle, typically by a shaft which is perpendicular to the axle, and gearing of the differential axle permits the wheels on opposite sides of the vehicle to turn at different speeds, which is necessary to avoid slippage between the wheel and the ground surface when turning the vehicle. The speed of the input shaft to the differential may be already reduced before it is input to the differential axle, from the speed of the motor, for example with a gear box or torque converter.

In addition to the speed reduction gearing of the motor, such a transmission requires gearing in the differential transfer case. A loss of power also results from changing the direction of rotation by 90 degrees in the differential transfer case, from the direction of the input shaft to the direction of the axle.

In addition, the wheel hubs to which the wheels are mounted, are typically journaled to the frame of the vehicle by bearings which are dedicated to that purpose. Loading the bearings of the differential is typically avoided, since the differential is usually in the center of the vehicle, and the hubs are on the sides.

Thus, a need exists for a gear reducing drive train which reduces power losses and the use of separate wheel support bearings.

SUMMARY OF THE INVENTION

In one aspect, the invention provides a planetary gear drive train in which the driven unit is journaled on the input shaft. Thereby, no additional structure or provision need be made to mount the driven unit.

For example, the driven unit may be a wheel hub and the invention may be incorporated in a drive train for propelling two laterally opposite driven units, such as the drive wheels of a golf cart or other vehicle, in the same rotational direction. A motor having a motor housing and a motor shaft may be provided coaxial with the driven units which drives the shaft in one direction and the housing in the other. A housing shaft is provided coaxial with the motor shaft and fixed to the motor housing to rotate in the same rotary direction as the housing. A pair of planetary gear clusters is provided, with each mounted adjacent an end of one of the shafts opposite from the motor. Each planetary gear cluster is driven by the adjacent shaft and has an output gear, and both output gears are driven in the same rotary direction. Each driven unit is driven by one of the output gears so as to rotate in the same direction as the output gear driving it. Thereby, low speed, high torque power is delivered to the driven units by a coaxial prime mover.

In an especially useful form, each planetary gear cluster further includes at least one pair of planet gears. Each pair of planet gears is connected together and of different sizes, and is journaled in a planet cage so as to orbit about the axis of the input shaft. The input shaft is rotationally coupled to the planet cage so as to rotationally drive the planet cage about the axis of the input shaft. This enables the input shaft to extend through the planetary gear cluster so as to mount the driven unit at the end of the cluster opposite from the input end.

In another useful aspect, each planetary gear cluster further includes a stationary gear. One of the planet gears of each pair of planet gears meshes with the stationary gear and the other planet gear of each said pair meshes with the output gear. By changing the relative sizes of the gears of each pair, different reductions, or a reverse in rotary direction, is provided.

In addition, the driven shaft at the center of the driven unit can be used as a power take-off, turning at a higher speed than the driven unit, in the same direction as the input shaft or in the opposite direction.

The foregoing and other objects and advantages of the invention will appear in the detailed description which follows. In the description, reference is made to the accompanying drawings which illustrate a preferred embodiment of the invention.

DETAILED DESCRIPTION OF THE PREFERRED EMBODIMENT

Figure 1:
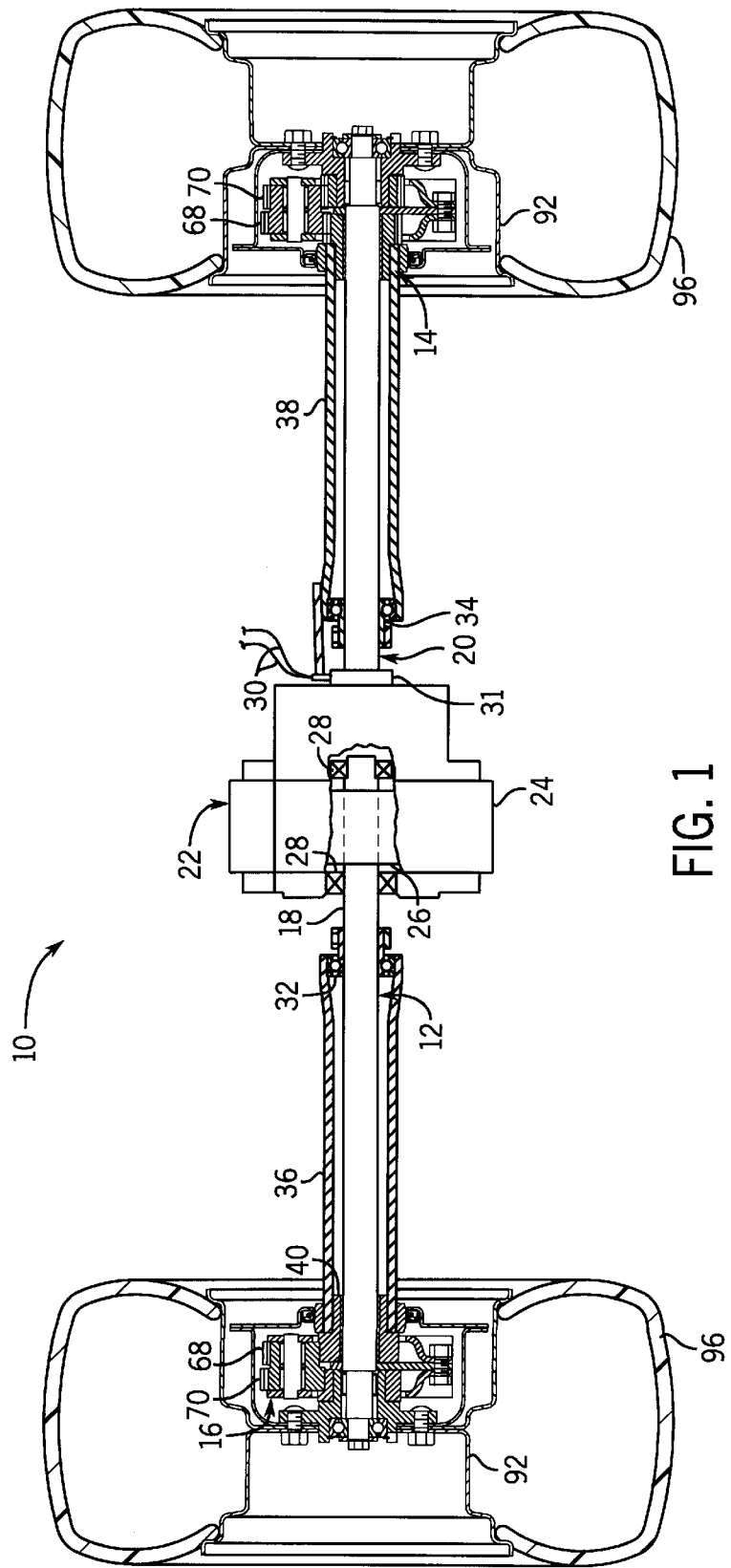
FIG. 1 is a plan view, partially in section, of a drive train incorporating the invention.

Referring to FIG. 1, a differential drive train 10 incorporating the invention is illustrated. The drive train 10 is for a vehicle, such as a golf cart with two drive wheels.

The differential 10 is not limited to use on vehicles, but could be used in any device incorporating a gear reduction transmission, whether it has a single driven unit or more.

The drive train 10 includes a differential axle 12 and a pair of laterally opposite planetary gear clusters 14 and 16 at laterally opposite ends of the axle 12. The axle 12 has laterally opposite first 18 and second 20 shafts which drive the respective gear clusters 12 and 14 at their ends.

The differential axle 12 also includes a motor 22. As illustrated, the motor 22 is an electric motor having a housing 24, in which the stator of the motor is contained, and a rotor 26 which is journaled by bearings 28 to the housing 24. Shaft 18 is fixed to the a rotor 26 and shaft 20 is fixed to the housing 24, so that shaft 12 rotates with the rotor 26 and shaft 20 rotates with the housing 24. Electrical power is supplied to the stator inside the housing 24 by wires 30 via slip ring 3 1. When power is supplied to the motor 22, the motor 22 rotates the shafts 12 and 20 in opposite directions. The direction of the shafts 12 and 20 may be reversed by reversing the polarity on the wires 30.

While the motor or prime mover 22 disclosed in the preferred embodiment is an electric motor, the invention is not limited to the prime mover 22 being an electric motor. The invention could be practiced with any prime mover drive arrangement, and the prime mover could be a mechanical differential or other power transfer device, in which the motor is not coaxial with the input shafts 12 and 20 of the planetary gear clusters.

Shafts 12 and 20 are journaled by respective bearings 32 and 34 inside respective stationary tubes 36 and 38 which could be used for mounting the drive train 10 to the frame or chassis of the vehicle or other device to which it is to be mounted, for example to the frame or chassis of a golf cart. Mounting structure other than tubes could also be used to journal the shafts 12 and 20, e.g., pillow block bearings or other journaling structure.

The planetary gear clusters 14 and 16 are essentially identical except for the orientation of the planetary gears as further described below, and therefore only one of the planetary gear clusters will be described in detail. The planetary gear cluster 14 is illustrated in detail in FIG. 2. Stationary gear 40 is fixed to the outer end of stationary tube 38, for example by welding or a press fit, and shaft 20 is journaled inside gear 40 by a bushing 42. Adjacent to the outer end of stationary gear 40, the central plate 44 of a planet gear cage 46 is mounted on shaft 20. Shaft 20 is ground flat on its opposite sides where it engages plate 44 so as to engage the double flat round hole 48 in the central plate 44, which is shown in FIG. 3. Thus, planet cage 46 rotates with and at the same speed as shaft 20.

Figure 2:
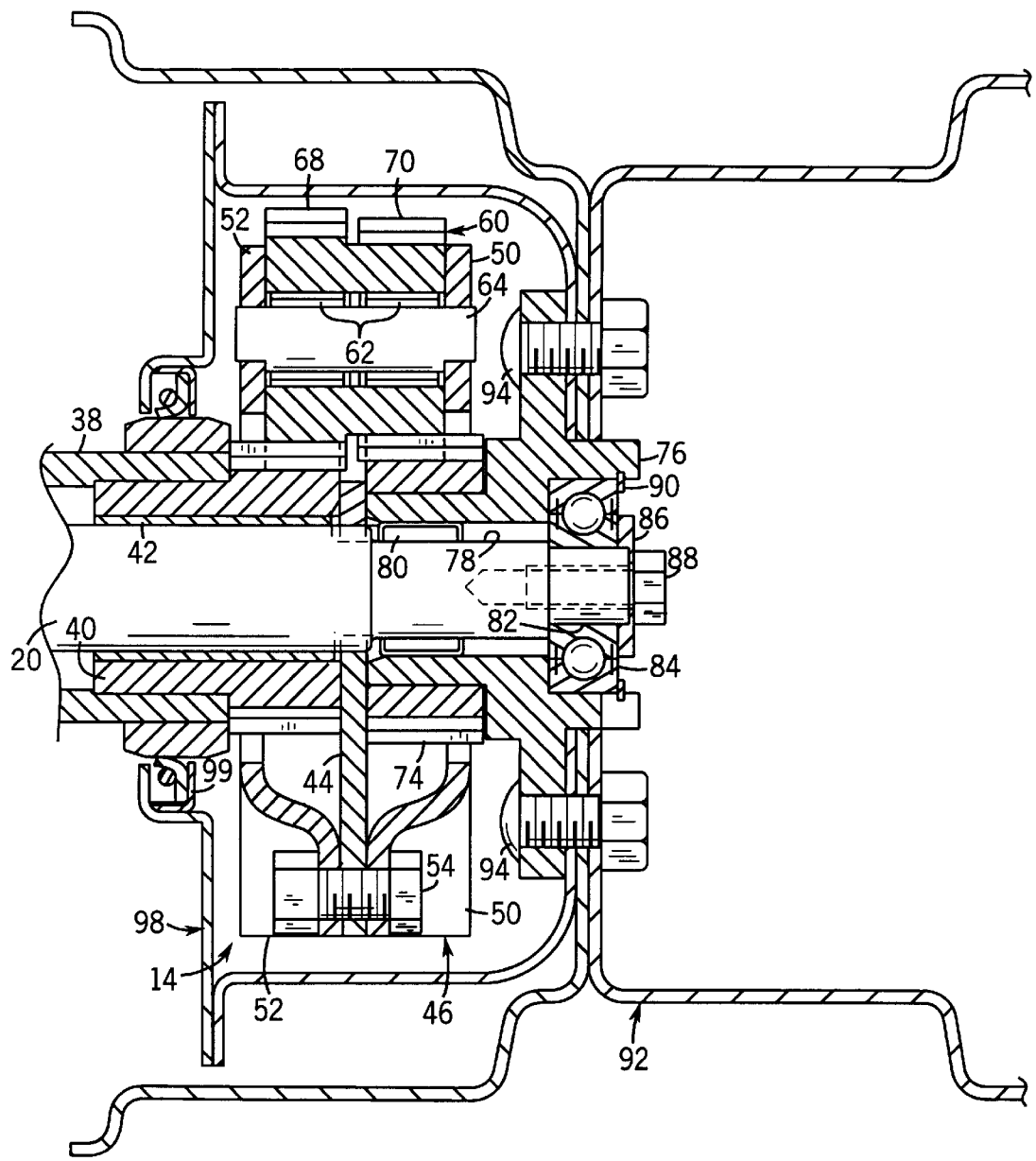
FIG. 2 is an enlarged view of the rightward portion of FIG. 1.
Figure 3:
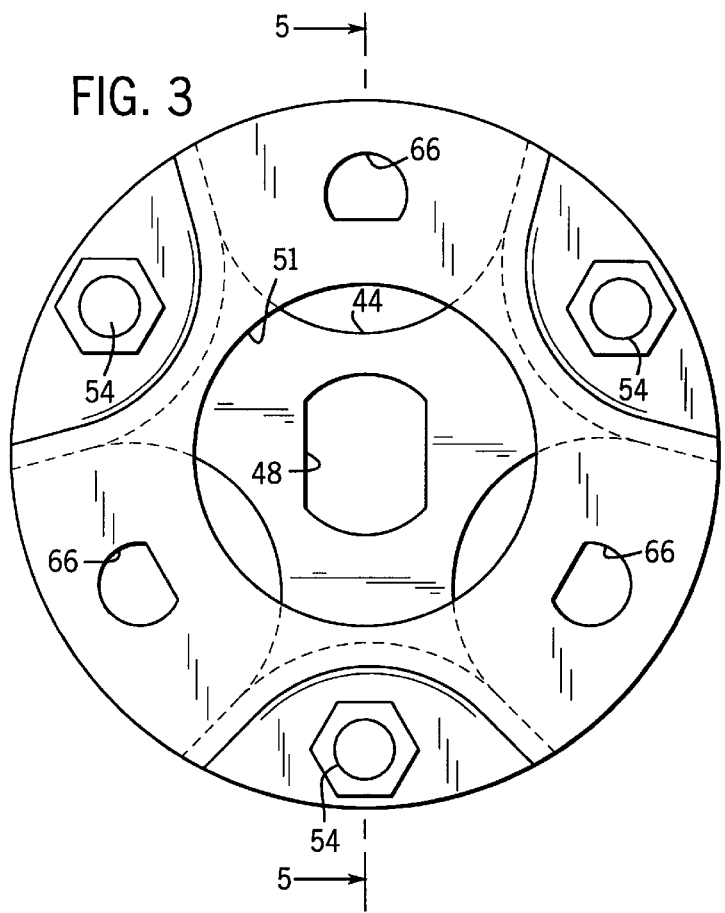
FIG. 3 is a side elevation view of a planet cage for the transmission shown in FIG. 2.
Figure 5:
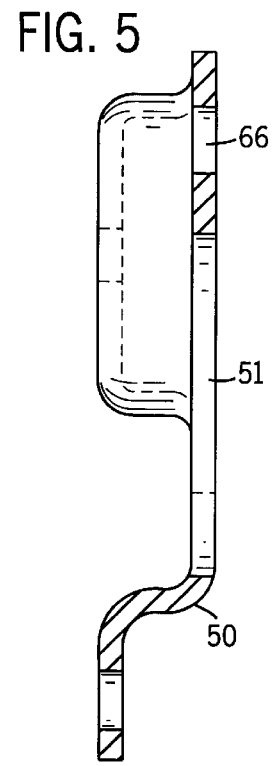
FIG. 5 is a sectional view along the plane of the line 5—5 of FIG. 3 of one of the outer plates of the planet cage of FIG. 3.
Figure 4:
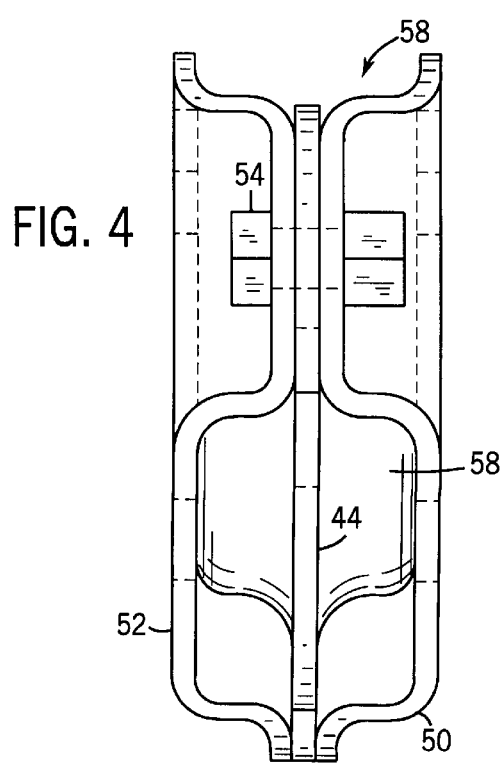
FIG. 4 is a front plan view of the planet cage of FIG. 3.
Figure 6:
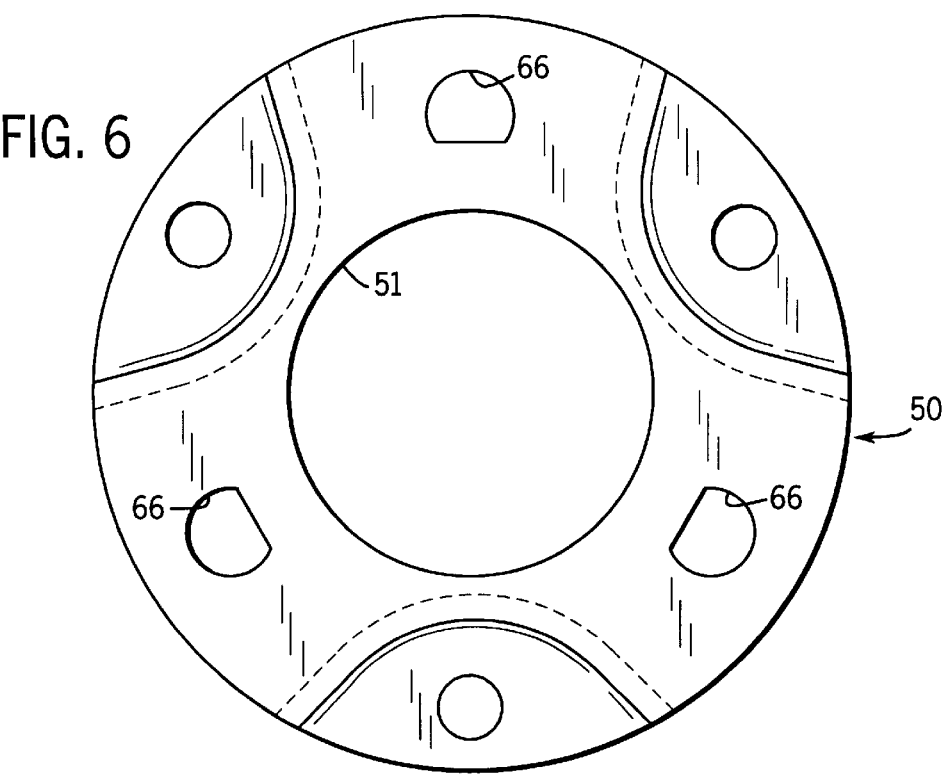
FIG. 6 is a side plan view similar to FIG. 3 but showing one of the outer plates alone.
Figure 7:
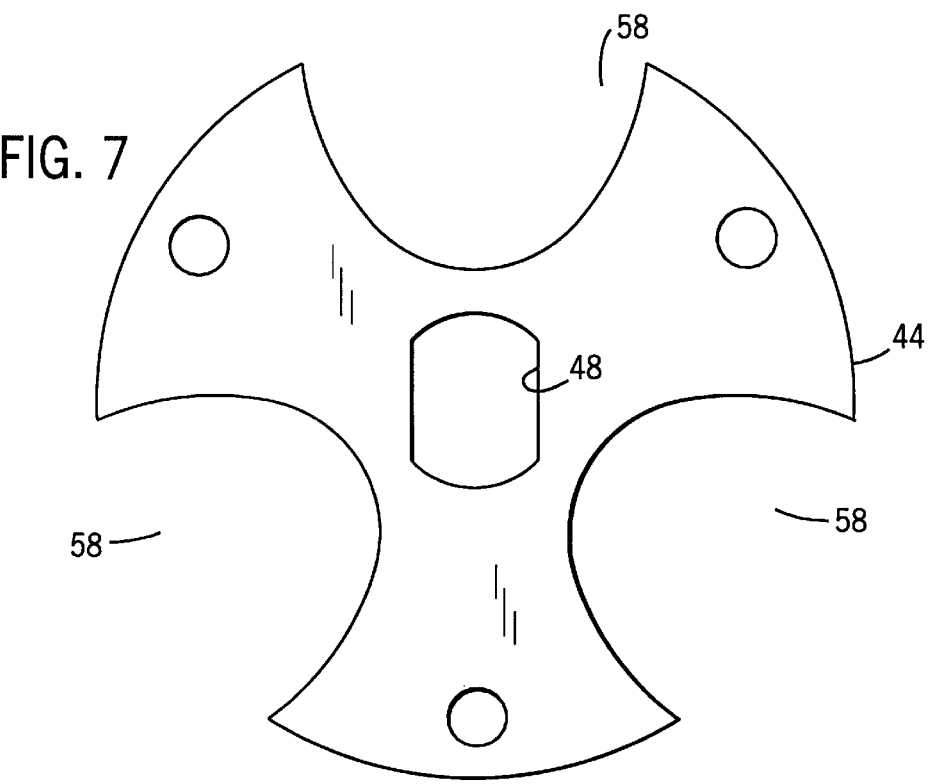
FIG. 7 is a side plan view of a center plate for the planet cage of FIG. 3.

Central plate 44 is flat as shown in FIGS. 2, 4 and 7. Planet cage 46 also includes two outer plates 50 and 52 which are fixed by three fasteners 54 to the central plate 44. The outer plates 50 and 52 and the central plate 44 are formed so as to define three pockets 58, equiangularly spaced at 120 degrees from each other. Each pocket 58 receives a planet gear pair 60 which is journaled by needle bearings 62 on shaft 64 which has its D shaped ends fixed in similarly shaped holes 66 of the outer plates 50 and 52. Each outer plate 50, 52 has a hole 51 in it.

Each planet gear pair 60 includes a first gear 68 and a second gear 70, the gears 68 and 70 being integrally connected. Each gear 68 is in meshing engagement with the stationary gear 40 and each gear 70 is in meshing engagement with an output gear 74 which is fixed, for example by welding or a press fit, to a hub 76. The hub 76 is journaled on reduced diameter portion 78 of shaft 20 by needle bearing 80 and is journaled adjacent its outer end to reduced diameter portion 82 of shaft 20 by ball bearing 84 which has its inner race fixed to the shaft 20 by washer 86 and bolt 88 and its outer race fixed to the hub 76 by snap ring 90. Wheel 92 is fixed to the hub 76 by bolts 94, and tires 96 (FIG. 1) are mounted on the wheels 92. The meshing surfaces of the planet gear cluster 14 are contained within a housing 98 which is partly filled with oil or grease and is also fixed to the hub 76 by the bolts 94. A seal 99 helps keep the lubricant inside the housing 98 and to seal dirt out.

The gear cluster 16, on the left side of FIG. 1, is the mirror image of the gear cluster 14, except that the gear pair 60 is reversed in orientation. The reason for this is that the wheels 92 must be driven in the same direction. When first gear 68 is larger than second gear 70, the output gear 74 is driven in the same direction as the shaft 20. When the first gear 68, which meshes with the stationary gear 40, is smaller in nominal diameter than the second gear 70, which meshes with the output gear 74, as in the case of the gear cluster 16, the output gear and therefore the hub wheel and tire, are driven in the direction which is opposite from the direction of the shaft 12. Thus, with the drive differential of FIG. 10. as long as the gear reductions provided by the gear clusters 14 and 16 are equal, the wheels or driven units 92 will be driven in the same direction. If the vehicle is driven in a straight line, they will also be driven at the same speed. However, if the vehicle is being turned, either wheel can rotate faster or slower than the other, to prevent slip.

Large gear reductions are possible with the planetary gear units 14 and 16. Reductions are made larger by making the pitch diameters of the gears 68 and 70 closer to one another. When the pitch diameters of the gears 68 and 70 are equal to one another, the reduction is infinite but the speed of the wheels 92 is zero. Thus, by making the gears 68 and 70 close (but not equal) in pitch diameter, high speed inputs can be efficiently reduced to very low speed outputs with consequent torque increases.

However, the planet cage is driven at the speed of the input shaft. For high speed inputs, this can result in large centrifugal forces on the planet gears. Thus, a speed reduction of the input shaft is desirable to reduce the speed of the planet cage.

This is also provided for in the drive train 10. This is provided because both the motor housing 24, to which shaft 20 is affixed, and the rotor 26, to which shaft 18 is affixed, rotate. If the motor housing 24 did not rotate, as would be typical, the speed of the shaft 18 would be two times what it is in the drive train of FIG. 1.

The shafts 12 and 20 extend axially through the gear clusters 14 and 16. The shaft 20 spins in the same direction as the hub 76, but at a faster speed, and the shaft 12 spins in the opposite direction from the hub 76 which it mounts, also at a faster speed. Thus, at the outer end of each planetary gear cluster and axle shaft, a high speed output could also be provided off of the input shaft. This may have more applications when the planetary gear cluster is used to drive a stationary load, so that the input shaft could be used as a second power take-off shaft.

Figure 8:
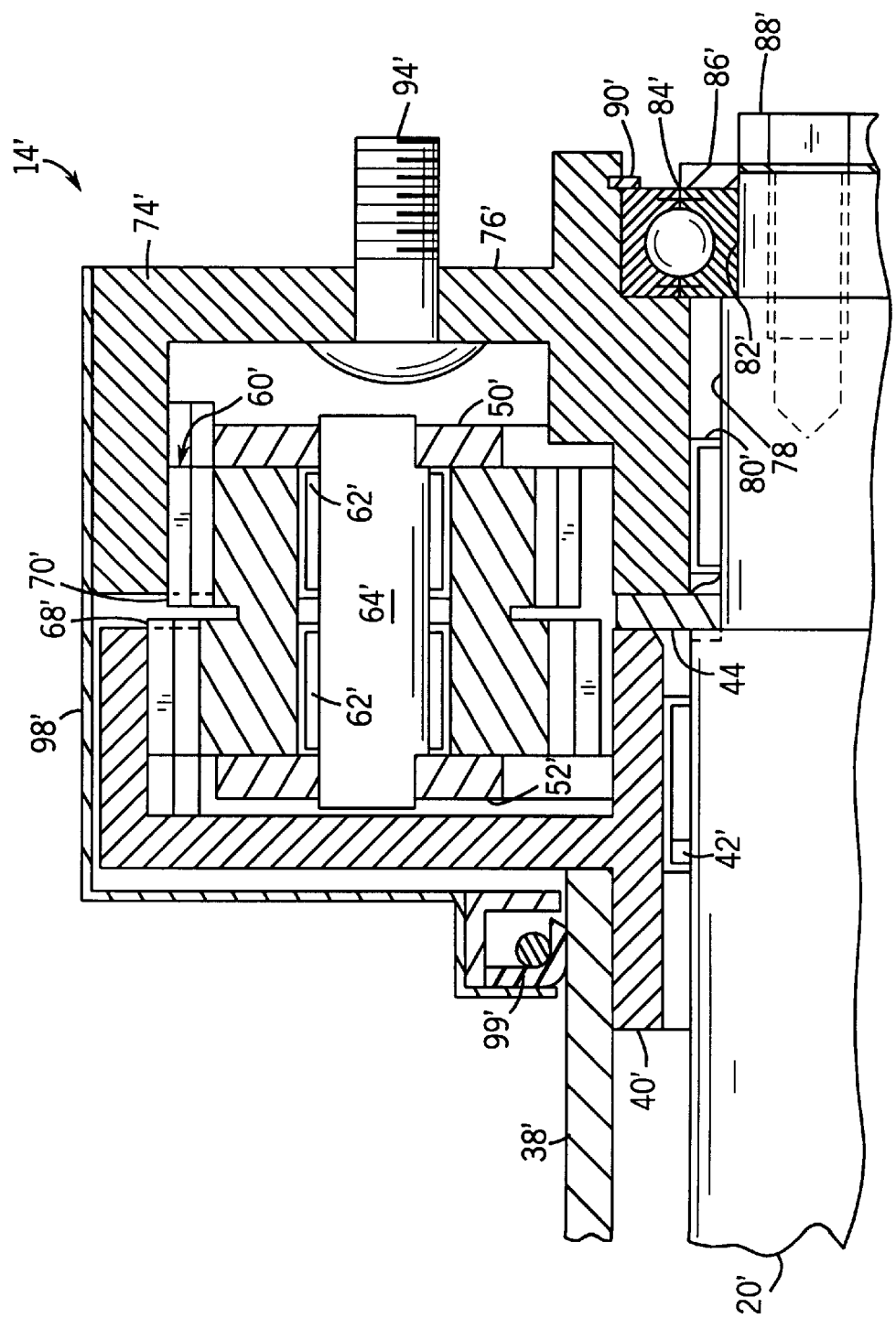
FIG. 8 is a sectional view of an alternate embodiment of the invention.

FIG. 8 illustrates an alternate embodiment 14' in which the stationary gear 40' and the output gear 74' are internal gears. The hub 76' is made integral with the output gear 74' in the gear cluster 14'. In FIG. 8, elements corresponding to elements of the gear cluster 14 are labeled with the same reference number plus a prime (')sign.

Preferred embodiments of the invention have been described in detail. Many modifications and variations to the preferred embodiments described will be apparent to those skilled in the art. Therefore, the invention should not be limited to the embodiments described but should be defined by the claims which follow.

I claim:

1. A planetary gear transmission drive including a driven unit, said drive train propelling said driven unit rotationally, comprising:
   a rotationally fixed frame member;
   an input shaft supported by said frame member and having an axis which is coaxial with said driven unit, said input shaft being driven rotationally relative to said frame member about said axis by a prime mover;

a planetary gear cluster, said planetary gear cluster being mounted radially outwardly of said input shaft, said planetary gear cluster being driven by said input shaft and having an output gear which is driven by said input shaft through said planetary gear cluster, wherein said driven unit is journaled relative to said frame member directly solely by said input shaft so as to be directly rotationally supported relative to said frame member by only said input shaft and wherein said driven unit is driven by said output gear.

2. A drive train as claimed in claim 1, wherein said output gear is journaled on said input shaft.

3. A drive train as claimed in claim 1, wherein said driven unit is a wheel hub.

4. A drive train as claimed in claim 1, wherein said planetary gear cluster further includes at least one pair of planet gears, each pair of planet gears being connected together and of different sizes, each pair of planet gears being journaled in a planet cage so as to orbit about said axis of said input shaft, and wherein said input shaft is rotationally coupled to said planet cage so as to rotationally drive said planet cage about said axis.

5. A drive train as claimed in claim 4, wherein said planetary gear cluster further includes a stationary gear and one of said planet gears of each said pair of planet gears meshes with said stationary gear and the other planet gear of each said pair meshes with said output gear.

6. A drive train as claimed in claim 5, wherein said input shaft is journaled in said stationary gear.

7. A planetary gear transmission drive train including first and second driven units, said drive train propelling said driven units rotationally, comprising:

a rotationally fixed frame member;

a first drive having:
  a first input shaft supported by said frame member and having an axis which is coaxial with said first driven unit, said first input shaft being driven rotationally relative to said frame member about said axis by a prime mover;
  a first planetary gear cluster, said first planetary near cluster being mounted radially outwardly of said first input shaft, said first planetary gear cluster being driven by said first input shaft and having a first output gear which is driven by said first input shaft through said first planetary gear cluster, wherein said first driven unit is journaled relative to said frame member directly solely by said first input shaft so as to be directly rotationally supported relative to said frame member by only said first input shaft and wherein said first driven unit is driven by said first output gear; and a second drive laterally opposite from said first drive and having:
  a second input shaft supported by said frame member and having an axis which is coaxial with said second driven unit, said second input shaft being driven rotationally relative to said frame member about said axis by said prime mover;
  a second planetary gear cluster, said second planetary gear cluster being mounted radially outwardly of said second input shaft, said second planetary gear cluster being driven by said second input shaft and having a second output gear which is driven by said second input shaft through said second planetary gear cluster, wherein said second driven unit is journaled relative to said frame member directly solely by said second input shaft so as to be directly rotationally supported relative to said frame member by only said second input shaft and wherein said second driven unit is driven by said second output gear;

wherein the driven units of said laterally opposite drive trains are driven in the same rotational direction;

wherein said prime mover includes a motor coaxial with the driven units and having a motor housing and a rotor, said motor driving said housing in one rotary direction and said rotor in an opposite rotational direction; and wherein one of said input shafts of said laterally opposite drives is driven by said housing and the other of said input shafts of said laterally opposite drives is driven by said rotor.

8. A drive train as claimed in claim 7, wherein each said planetary gear cluster includes a stationary gear, at least one pair of planet gears, each pair of gears being connected together and of different sizes, and an output gear, one of said planet gears of said pair meshing with said stationary gear and the other planet gear of said pair meshing with said output gear.

9. A drive train as claimed in claim 8, wherein each said input shaft is rotationally coupled to a planet cage of said planetary gear cluster.

* * * * *